No. 875,492. PATENTED DEC. 31, 1907.
J. H. BAUMAN.
WIRE ROLLER.
APPLICATION FILED APR. 29, 1907.
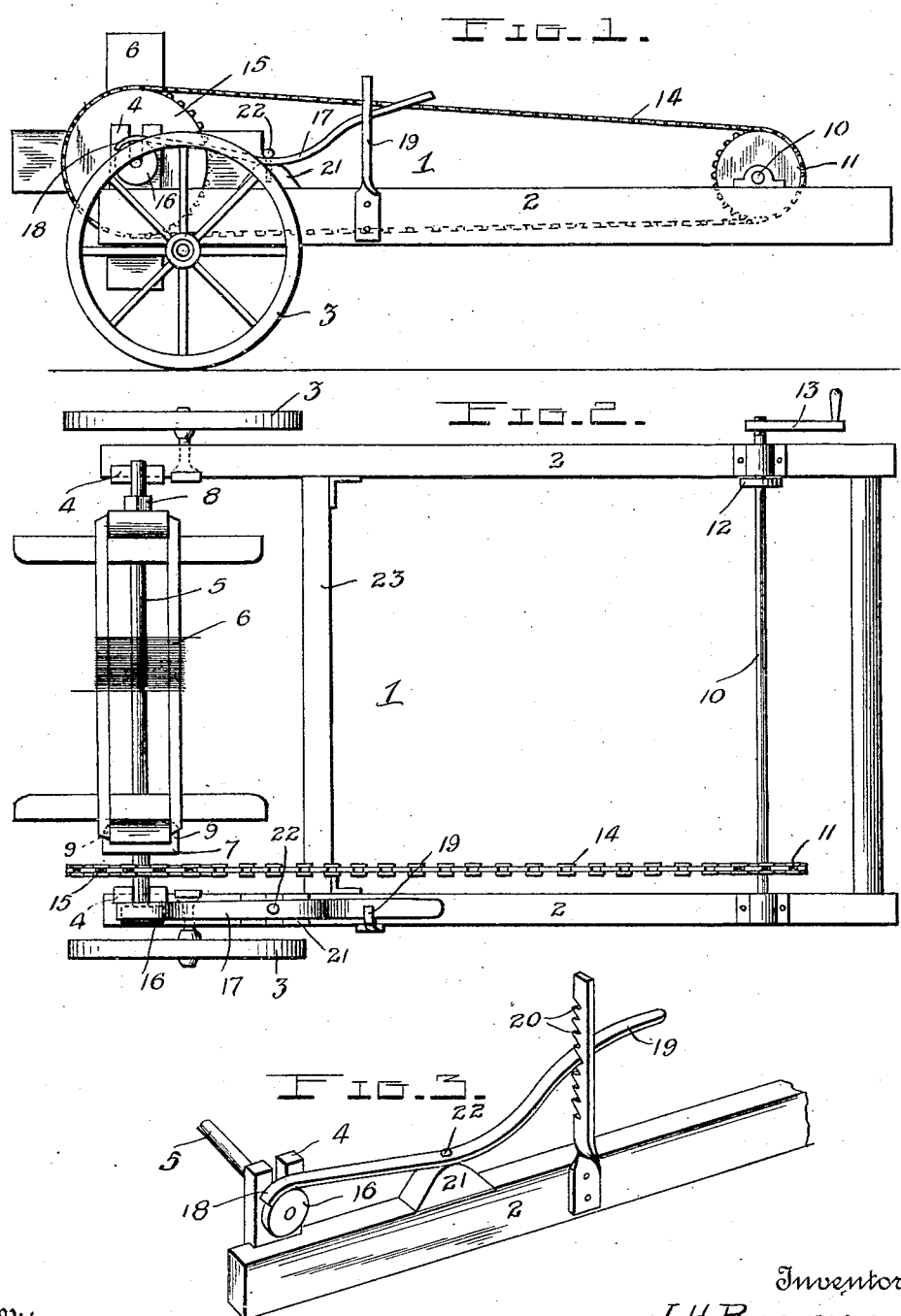
Witnesses
Chas. P. Griesbauer
C. H. Griesbauer
Inventor
J. H. Bauman
by H. B. Willson & Co.
Attorneys

UNITED STATES PATENT OFFICE.

JOHN H. BAUMAN, OF CONCORD, NEBRASKA.

WIRE-ROLLER.

No. 875,492.  Specification of Letters Patent.  Patented Dec. 31, 1907.

Application filed April 29, 1907. Serial No. 370,934.

*To all whom it may concern:*

Be it known that I, JOHN H. BAUMAN, a citizen of the United States, residing at Concord, in the county of Dixon and State of Nebraska, have invented certain new and useful Improvements in Wire-Rollers; and I do declare the following to be a full, clear, and exact description of the invention, such as will enable others skilled in the art to which it appertains to make and use the same.

This invention relates to a wire roller, or more particularly to a device by means of which ordinary fence wire can be transported from place to place upon a farm, as for instance, along the line of posts to which the wire is to be secured. It is also adapted for being used in rolling up such wire after the same has been removed from its supports and transported to another place, for subsequent use or for storage.

The object of the invention is to provide a device of this kind which will be simple, cheap and efficient, and by means of which the wire can be easily transported and placed in position along side of the posts or removed therefrom without the usual danger of damage to the clothes or hands of the operator, and especially in handling barbed wire.

In the accompanying drawings, which illustrate the invention,—Figure 1 is a side elevation of a machine embodying the invention; Fig. 2 is a top plan view of the same; Fig. 3 is a perspective view of the rolling mechanism and the means for controlling the same.

Referring more particularly to the drawings, 1 indicates a wheeled vehicle or support which may be of any suitable size, and is adapted to be drawn about by the forward ends of the handles or side pieces 2, similar to a cart, the rear end of the device being supported by wheels 3.

Mounted between the rear ends of the side pieces 2, as by means of open brackets or bearings 4, is a shaft 5, upon which an ordinary roll of wire 6 can be rigidly secured between a clamp 7 and a nut 8. The clamp 7 is rigidly secured to the shaft 5 and is provided at its ends with shoulders 9, as by bending the ends of the clamp at right angles so as to engage with one of the cross heads of the roll and thereby cause them to turn in unison.

A shaft 10 is journaled across the outer end of the handle 2, and is provided with a sprocket 11, near one end, which engages with the inner face of one side piece, and a shoulder is formed near the outer end of the shaft, as by means of a collar 12, which engages with the inner face of the other handle and thereby prevents longitudinal movement of said shaft 10 in its bearings. The outer end of the shaft 10 is provided with a crank 13, by means of which it and the sprocket 11 can be rotated.

A chain 14 extends from the sprocket 11 to a sprocket 15 on the shaft 5 adjacent to the clamp 7 for the purpose of rotating the spool by means of the crank 13. The outer end of the shaft 5 is provided with a friction drum 16 with which a brake 17 is adapted to engage for controlling the movement of the shaft 5 or even holding it against rotation when desired. The rear end of the brake is preferably curved, as shown at 18, for engaging with the drum or roller 16, and the forward end of said brake is adapted to be adjustably secured by means of a standard 19, which has its inner face notched or shouldered, as at 20, for the reception of the end of the brake 17. The brake is preferably formed from a thin strip of flexible material, which is pivotally secured intermediate its ends upon a block 21 upon the rear end of one of the side pieces 2, and it is placed in its operative engagement with the friction roller by lifting up the forward end and causing it to engage with one of the notches 20.

The brake is preferably secured by means of a bolt 22, which will permit of a lateral movement of its ends, as well as a vertical movement, whereby its forward end may be disengaged from the standard 19, and its rear end can be moved out of the way of the friction drum 16 when the shaft 5 is being removed from or placed within its bearings. The rear cross piece 23 between the two side pieces is preferably located at a sufficient distance in front of the rear ends of the side pieces as to permit of the free rotation of the spool without engaging therewith.

In using my wire roller, as above described, the shaft 5 is removed from its bearing, after having had the chain 14 removed from the sprocket 15, and the shaft is inserted through the hole in said spool until the clamp 7 engages with one end of the spool, and the nut 8 is then screwed up tightly against the other end of the roll to hold it in engagement with the clamp. If the spool is full of wire it can be easily transported wherever desired, as from the store house or barn to the place where it is to be used. One end of the wire is then fastened, as to one of the posts, and the device is drawn forward adjacent to the line of posts, whereby the wire is unwound from the spool and laid alongside of the posts in position for conveniently fastening it to the posts in the ordinary manner. After one spool has been emptied it can be removed and another placed on the shaft, and the device drawn forward as before, the end of the new wire being connected with the end of the wire just laid or to a post or other stationary object, as may be desired.

When it is desired to use the device for taking up a wire that has been removed from the posts, an empty spool is placed upon the shaft and the end of the wire to be wound thereon is secured thereto in any manner. The chain 14 is then placed upon the sprockets 11 and 15 and the shaft 10 is rotated by means of the crank 13. The device is moved forward as the crank is rotated, and the wire is thereby wound upon the spool as fast as the device moves forward. In this manner, a very simple and efficient means is provided for quickly stretching a wire, as when it is desired to fence off a portion of a field for the use of stock of any kind, or to place a fence around a straw stack, corn pen or the like, to prevent the stock from getting access thereto. After the wire has thus temporarily served its purpose, it can be quickly removed and taken wherever desired.

Having described my invention, I claim:—

In a wire roller, a wheeled vehicle having open bearings at its rear end and a block upon one side adjacent to one of said bearings, a headed bolt in said block, a standard on said side piece adjacent to said block and having its inner face shouldered, a shaft journaled in the forward end of the vehicle and provided with a wheel, a shaft removably mounted in the open bearings having means for holding a wire spool and provided at one end with a wheel and a friction drum, a flexible connector upon said wheels, and a brake comprising a perforated flat strip of metal pivotally engaging with said bolt, the forward end of the brake being adapted to engage with the shoulders of the standard, and the rear end being curved and adapted to engage with said friction drum.

In testimony whereof I have hereunto set my hand in presence of two subscribing witnesses.

JOHN H. BAUMAN.

Witnesses:
   JOHN LOCKHART,
   LLOYD BLANKENSHIP.